US012064697B2

(12) United States Patent
Yu et al.

(10) Patent No.: US 12,064,697 B2
(45) Date of Patent: *Aug. 20, 2024

(54) CROWD-SOURCED DATA COLLECTION AND LABELLING USING GAMING MECHANICS FOR MACHINE LEARNING MODEL TRAINING

(71) Applicant: SideChef Group Limited, Hong Kong (CN)

(72) Inventors: Kevin Yu, Hong Kong (CN); Simone Rebaudengo, Hong Kong (CN); Nick Pittom, Hong Kong (CN); Kang Zhang, Hong Kong (CN); Matt Au, Hong Kong (CN)

(73) Assignee: SideChef Group Limited, Hong Kong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/208,458

(22) Filed: Jun. 12, 2023

(65) Prior Publication Data

US 2023/0321550 A1 Oct. 12, 2023

Related U.S. Application Data

(60) Division of application No. 16/817,358, filed on Mar. 12, 2020, now Pat. No. 11,712,633, which is a (Continued)

(51) Int. Cl.
*A63F 13/825* (2014.01)
*A63F 13/58* (2014.01)

(Continued)

(52) U.S. Cl.
CPC ............ *A63F 13/825* (2014.09); *A63F 13/58* (2014.09); *G06F 18/2155* (2023.01);

(Continued)

(58) Field of Classification Search
CPC ...... G06K 9/6259; G06N 20/00; A63F 13/58; A63F 13/825
See application file for complete search history.

(56) References Cited

U.S. PATENT DOCUMENTS 6,213,871 B1 * 4/2001 Yokoi ..................... A63F 13/92 463/40
6,313,843 B1 * 11/2001 Tanii ..................... G06N 3/006 345/473

(Continued)

FOREIGN PATENT DOCUMENTS

CN 106202269 A 12/2016
CN 109918525 A 6/2019

OTHER PUBLICATIONS

International Search Report and Written Opinion of the International Searching Authority Dated Aug. 28, 2020; International Application No. PCT/CN2019/122166, 11 pp. total.

*Primary Examiner* — Chase E Leichliter
(74) *Attorney, Agent, or Firm* — WOMBLE BOND DICKINSON (US) LLP

(57) ABSTRACT

A gamified application is provided for users to feed animated virtual characters with images of real-world food items. The images fed to the virtual characters are to be uploaded to a data store in a cloud environment, for use in training a custom machine learning model. A server in the cloud environment receives a photo of a food item fed to a virtual character in an augmented reality environment in the gamified application executing on a user device, invokes the custom machine learning model to generate classification information for the photo, sends the classification information to the user device for verification by a user, and stores the verified information to the data store used for periodically training the machine learning model. Over time, the (Continued)

Receive, at a server in a cloud environment, a photo of a food item from an augmented reality environment in a gamified application executing on a user device — 1101

In response to receiving the photo, generating, by a machine learning model executing in the cloud environment, classification information for the food item represented by the photo — 1103

Send the classification information to the user device for display in the augmented reality environment thereon; — 1105

Send the second classification label and the second set of attributes to the user device for display in the augmented reality environment thereon — 1107

Receive, from the user device, verified information that includes an indication for associating the photo with a virtual character, a third classification label, and a third set of attributes for the food item represented by the photo, wherein the third set of attributes are at least partially overlapped with the second set of attributes — 1109

Store the photo, the first classification label, the first set of attributes, and the confirmed information into a data store in the cloud environment — 1111 data store would include a large volume of food images with label data verified by a large number of users.

17 Claims, 13 Drawing Sheets

Related U.S. Application Data continuation of application No. PCT/CN2019/122166, filed on Nov. 29, 2019.

(51) Int. Cl.

| | |
|---|---|
| ***G06F 18/214*** | (2023.01) |
| ***G06N 20/00*** | (2019.01) |
| ***G06T 19/00*** | (2011.01) |
| ***G06V 10/778*** | (2022.01) |
| ***G06V 20/10*** | (2022.01) |
| ***G06V 20/20*** | (2022.01) |
| ***G06V 20/70*** | (2022.01) |
| *G06V 20/68* | (2022.01) |

(52) U.S. Cl.

CPC .......... *G06N 20/00* (2019.01); *G06T 19/006* (2013.01); *G06V 10/7784* (2022.01); *G06V 10/7788* (2022.01); *G06V 20/10* (2022.01); *G06V 20/20* (2022.01); *G06V 20/70* (2022.01); *A63F 2300/65* (2013.01); *A63F 2300/695* (2013.01); *G06V 20/68* (2022.01)

(56) References Cited

U.S. PATENT DOCUMENTS

| | | | | |
|---|---|---|---|---|
| 9,980,100 | B1 * | 5/2018 | Charlton | G06V 20/20 |
| 11,712,633 | B2 * | 8/2023 | Yu | A63F 13/655 382/159 |
| 2001/0036859 | A1 * | 11/2001 | Yokoi | A63F 13/825 463/30 |
| 2003/0216160 | A1 * | 11/2003 | Yokoi | A63F 13/92 463/1 |
| 2015/0379892 | A1 * | 12/2015 | Sako | G16H 20/60 434/127 |
| 2016/0236096 | A1 * | 8/2016 | Trzecieski | A63F 13/2145 |
| 2018/0250585 | A1 * | 9/2018 | Weissman | G01J 3/0272 |
| 2019/0087842 | A1 * | 3/2019 | Koenig | A63F 13/61 |
| 2020/0312003 | A1 * | 10/2020 | Borovikov | A63F 13/213 |
| 2020/0327976 | A1 * | 10/2020 | Pryor | G16H 40/63 |
| 2020/0406149 | A1 * | 12/2020 | Zhang | A63F 13/92 |
| 2021/0166077 | A1 * | 6/2021 | Yu | A63F 13/213 |
| 2021/0271360 | A1 * | 9/2021 | Ihara | G06F 3/048 |
| 2023/0321550 | A1 * | 10/2023 | Yu | G06F 18/2155 382/159 |

* cited by examiner

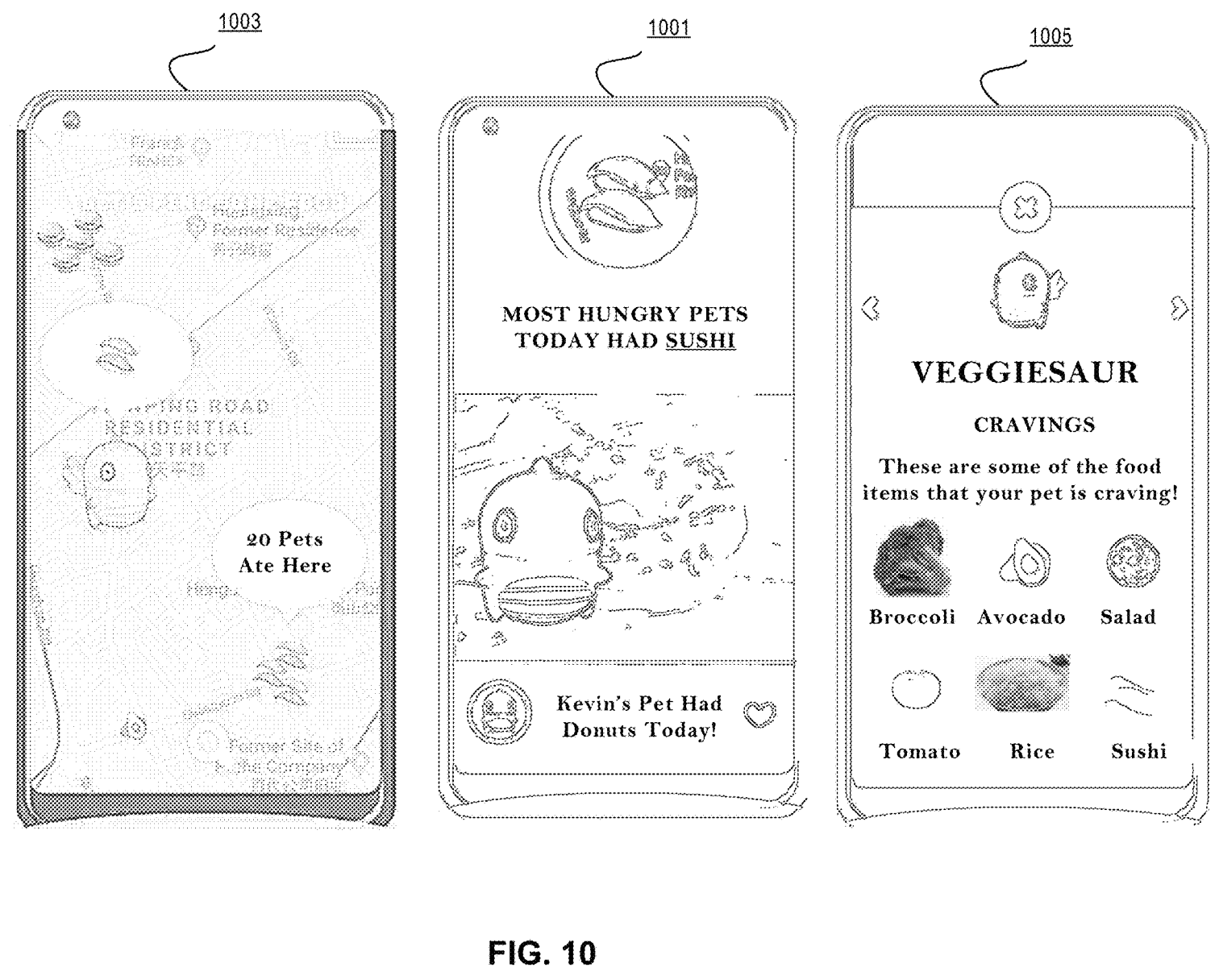

1005

VEGGIESAUR

CRAVINGS

These are some of the food items that your pet is craving!

Broccoli

Avocado

Salad

Tomato

Rice

Sushi

1001

MOST HUNGRY PETS TODAY HAD SUSHI

Kevin's Pet Had Donuts Today!

1003

20 Pets Ate Here

FIG. 10

CROWD-SOURCED DATA COLLECTION AND LABELLING USING GAMING MECHANICS FOR MACHINE LEARNING MODEL TRAINING

TECHNICAL FIELD

This application is a divisional application of U.S. patent application Ser. No. 16/817,358, filed on Mar. 12, 2020, which is a continuation of International Application No. PCT/CN2019/122166, filed on Nov. 29, 2019. Which are herein incorporated by reference in their entireties.

TECHNICAL FIELD

Embodiments of the present invention relate generally to machine learning. More particularly, embodiments of the disclosure relate to crowd-sourced data collection and labelling using gaming mechanics for machine learning model training.

BACKGROUND

Machine learning (ML) models typically need to be trained using a sufficiently large dataset for good performance. However, training data collection can be a cumbersome process, particularly in areas where it may not be feasible to collect such training data automatically. For example, to train an ML model for food image recognition, training data is typically collected and labeled manually, partly because there is a large variety of food items around the globe, and there are many variants of the same item, with each variant having a different look and a different set of ingredients.

Manual food image collection is daunting due to the sheer volume and variety of data that needs to collected; and is prone to labeling errors, because a user may not always know the exact ingredients contained in a particular food item.

SUMMARY

A gamified application is provided for users to feed animated virtual characters with images of real-world food items. The images fed to the virtual characters are to be uploaded to a data store in a cloud environment, for use in training a custom machine learning model. In one embodiment, a server in a cloud environment receives a photo of a food item fed to a virtual character in an augmented reality environment in the gamified application executing on a user device, invokes the custom machine learning model or a set of image recognition APIs to generate classification information for the photo, sends the classification information to the user device for verification by a user, and stores the verified information to the data store used for periodically training the machine learning model. Over time, the data store would include a large volume of food images with label data verified by a large number of users.

The other functions and advantages of various embodiment of the invention will be apparent from the accompanying drawings and from the detailed description that follows.

BRIEF DESCRIPTION OF THE DRAWINGS

Embodiments of the invention are illustrated by way of example and not limitation in the figures of the accompanying drawings in which like references indicate similar elements.

FIG. 10 illustrates screens showing how a virtual character finds a next food item to eat in accordance with an embodiment.

DETAILED DESCRIPTION

Figure 1:
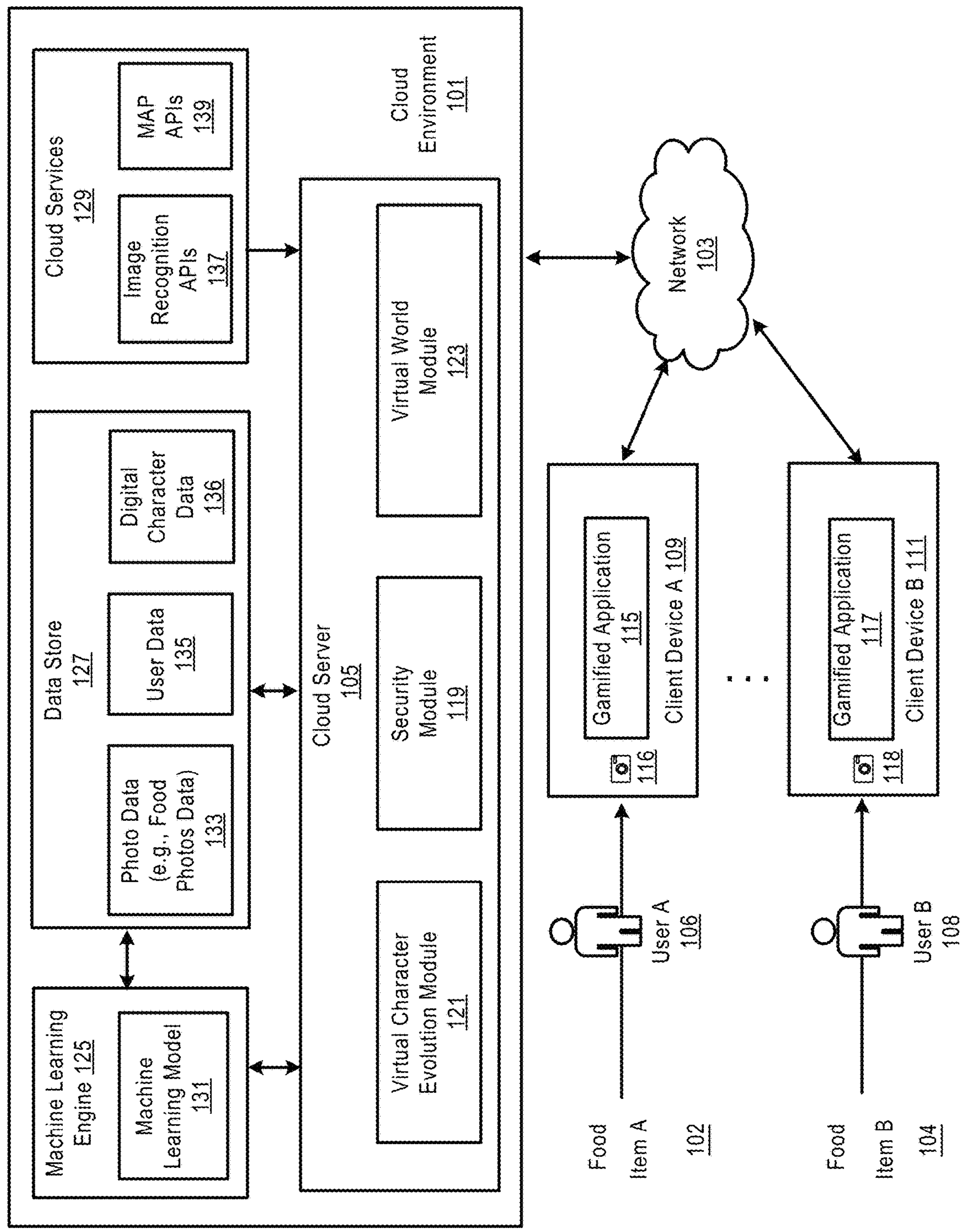
FIG. 1 illustrates an example system for data collection and labeling in accordance with an embodiment.

To address the issues described above, various embodiments are described in the disclosure to enable crowd-sourced data collection and labeling for use in training an image recognition machine learning model. A gamified application can run on a client device to provide an augmented reality environment where a user can feed photos of food items to a virtual character. With photos of various food items fed to the virtual character, the virtual character can evolve along one of a number of predetermined evolution paths, and experience behavior changes as it evolves. The process of taking photos of food items and nurturing a virtual character (e.g., a virtual pet) as well as the monetary or virtual rewards once the virtual character reaches a certain stage of the chosen evolution path would incentivize users to actively participate in a crowdsourced data collection and labelling. The embodiments also facilitate the data labeling during the gamified experience of manual data collection, since the system may automatically generate a substantial portion of the labeling data, and users in many cases just need to verify the labeling data.

According to one exemplary method of data collection and labeling, a server in a cloud environment receives a photo of a food item from an augmented reality environment in a gamified application executing on a user device. In response to receiving the photo, the server generates a first set of attributes and a first classification label for the photo using a machine learning model provided as part of an image recognition APIs; and generates a second set of attributes and a second classification label for the photo using a custom machine learning model.

In one embodiment, the server subsequently sends the second classification label and the second set of attributes to the user device for display in the augmented reality environment thereon. The server can receive, from the user device, verified information which includes an indication for associating the photo with a virtual character, a third classification label, and a third set of attributes for the photo, the third set of attributes being at least partially overlapped with the second set of attributes. The method further includes the operation of storing the food photo, the first classification label, the first set of attributes, and the verified confirmation into a data store in the cloud environment.

In one embodiment, the first classification label is the one with a highest probability value among several classification labels generated by an image recognition application programming interfaces (APIs), and the first set of attributes represent metadata for the photo, including least a location indicating where the photo has been taken.

In one embodiment, the second set of attributes of the photo include a set of ingredients of the food item represented by the photo or a list of nutrients of the food item, a taste of the food item, and a smell of the food item. The third set of attributes include a modified value for each of one or more attributes of the second set of attributes, and the third classification label can be entered by a user via a user device in response to a confirmation prompt displayed in the augmented reality environment.

In one embodiment, the custom machine learning model that generates the second set of attributes for the food item can be initially trained using manually collected training data, and training functions provided by the set of image recognition APIs; and can continue to be trained at a fixed interval using additional training data in the data store.

In one embodiment, the virtual character is generated by the server, and evolves along one of a number of predetermined evolution paths, each predetermined evolution path representing a number of food items in an ordered sequence. The virtual character can be a virtual pet, and the associating of the photo with the virtual character can be caused by feeding the food item represented by the photo to the virtual pet such that the virtual pet progresses along one of the predetermined evolution paths.

According to another embodiment, a game system comprises a processor; and a memory coupled with the processor to store instructions, which when executed by the processor, cause the processor to animate a virtual character in an augmented reality environment on a client device; wherein the virtual character is to be fed with a photo of a food item taken from a surrounding of the client device; wherein the feeding causes a change in one or more animated behaviors of the virtual character, and counts towards a number of required food items for an evolution path selected for the virtual character; and wherein an indication for a reward is generated upon a completion of the evolution path.

In one embodiment, the gamified application is to generate an alert when the client device with the gamified application running thereon moves within a predetermined distance to a food item on the evolution path, and the virtual character is selected based on one or more food pictures stored in a folder of the client device that are classified as being compatible with the virtual character.

The embodiments described herein can include non-transitory machine readable media that store executable computer program instructions that can cause one or more processors to perform the one or more methods described herein when the computer program instructions are executed by the one or more data processing systems. The instructions can be stored in non-volatile memory such as flash memory or other forms of memory.

The above summary does not include an exhaustive list of all embodiments in this disclosure. All systems and methods can be practiced from all suitable combinations of the various aspects and embodiments described in the disclosure.

FIG. 1 illustrates an example system for data collection and labeling in accordance with an embodiment. As shown in FIG. 1, a cloud environment 101 can include a cloud server 105, a data store 127, a machine learning engine 125 with a trained machine learning model 131 running thereon, and a number of cloud services 129, including image recognition APIs 137 and Map APIs 139.

The cloud server 105 can operate as a front server for handling communications between the cloud environment 101 and client devices 109 and 111 via a network 103. Each client device can be a mobile device such as a mobile phone. The network 103 can be any type of wireless networks, such as a local area network (LAN), a wide area network (WAN) such as the Internet, a cellular network, a satellite network, or a combination thereof.

The cloud server 105 includes a security module 119, a virtual character evolution module 121, and a virtual world module 123. The security module 119 can manage at least user authentication and authorization. The virtual character evolution module 121 can provide evolution logic for the evolution of virtual characters in the example system as well as track the evolution progression of the virtual characters.

The virtual world module 123 creates and manages a virtual world where all virtual characters in the example system live, including constantly searching for food items to eat based their associated evolution paths. Each of the modules 119, 121, and 123 in the cloud server 105 can be implemented in hardware, software, or a combination thereof. The virtual world module 123 can use the map APIs 139 to create a map with various types of food items scattered in the map. Users can use a location feature on their mobile devices to locate food items to feed their virtual characters.

An example of the image recognition APIs 137 is the Google vision APIs. The image recognition APIs 137 can provide one or more pre-trained machine learning models through representational state transfer (REST) and remote procedural call (RPC) APIs, and can classify images into predefined categories. The image recognition APIs 137 also includes functions to automate the training of custom machine learning models.

In one embodiment, the machine learning model 131 may be a custom machine learning model that is trained using the image recognition APIs 137 and a set of training images manually collected by a vendor that hosts the example system prior to being deployed to the machine learning engine 125. The machine learning engine 125 can be a managed service for training and running machine learning models. After being deployed, the custom machine learning model 131 can continue to be trained at a fixed interval using data from the data store 127.

As further shown in FIG. 1, the data store 127 can include photo data 133 and user data 135. The photo data 133 can be crowd-sourced photos, for example, photos of food items; classification labels of the photos; and other data related to the photos. The user data 135 can include data for user account management, for example, login credentials.

Gamified applications 115 and 117 can run on the client devices 109 and 111 respectively, and can provide a number of features that incentivize their users 106 and 108 to take photos of food items and tag and label the photos, which will eventually be stored in the data store 127. Each of gamified applications 115 and 117 can include an augmented environment, through which user A 106 or user B 108 can take a photo of food item A 102 or food item B 105. For example, user A 106 can take a photo of food item A 102 and user B 108 can take a photo of food item B 104. In FIG. 1, food item A 102 is a hand of bananas, and food item B is a piece of pizza. However, food item A 102 or food item B 104 can be any real-world food item, such as fried rice, pasta, apple pie, and banana.

Each of the gamified applications 115 or 117 can send the photo of a food item 102 or 104 to the cloud server 105, which can invoke the image recognition APIs 137 to initially determine at a rough level the general type of food the photo represents and attributes associated with the photo. For example, the image recognition APIs 137 can classify a photo for a hand of bananas as fruit; and generate metadata for the photo, for example, the location of the photo.

The cloud server 105 can subsequently provide the photo to the custom machine learning model 131, which may generate another classification label, and a set of attributes including a set of ingredients for the food item represented by the photo. Since the custom machine learning model 131 is initially trained using the set of image recognition APIs and is further trained periodically using crowd-sourced data verified by individual users, the classification label generated by the custom machine learning model 131 would be more accurate than the classification label generated by the image recognition APIs 137.

The classification label and the set of attributes generated by the custom machine learning model 131 can be sent by the server 105 to the gamified application 115 or 117, where the user 106 or 108 can deny, confirm, and modify the classification label; and modify the set of attributes by adding or deleting attributes from the set of attributes.

The user can feed the photo to a virtual character (not shown) by dragging or throwing the photo into the mouth of the virtual character, based on whether the food item represented by the photo is compatible with an evolution path associated with the virtual character. For example, if a veggie evolution path has been selected for the virtual character, the example system would not allow the user to feed the virtual character with Beef.

In one embodiment, the virtual character can be implemented by a data object in the virtual character evolution module 121, which can manage behaviors of the virtual character, the life cycle of the virtual character, and keep track of the numbers and types of food items that have been fed to the virtual character. In response to the photo being fed to the virtual character, the virtual character evolution model 121 can create an association between the virtual character and the photo. The association can be implemented in a database table, where the virtual character in one column corresponds to the photo in another column, and where there can be a one-to-many relationship between the column containing the virtual character and the column containing the photo.

In an alternative embodiment, the association between the virtual character and the photo can be stored in a data structure created for the virtual character. The data structure can be a linked list, a dynamic array, or another dynamic data structure. Associating the photo or the food item represented by the photo with the virtual character can be implemented by adding the photo to the data structure.

The cloud server 105 can receive from the gamified application 115 or 117 verified information, which includes a classification label, a set of attributes, and an indication that the photo is to be associated with the virtual character. The verified information is information that has been examined by the user 106 or 108, and confirmed to be accurate based on the experiences and knowledge of the user. The cloud server 105 can store the verified information received from the gamified application as well as the classification label and the metadata generated by the machine learning model provided as part of the image recognition APIs 137 to the data store 127.

Figure 2:
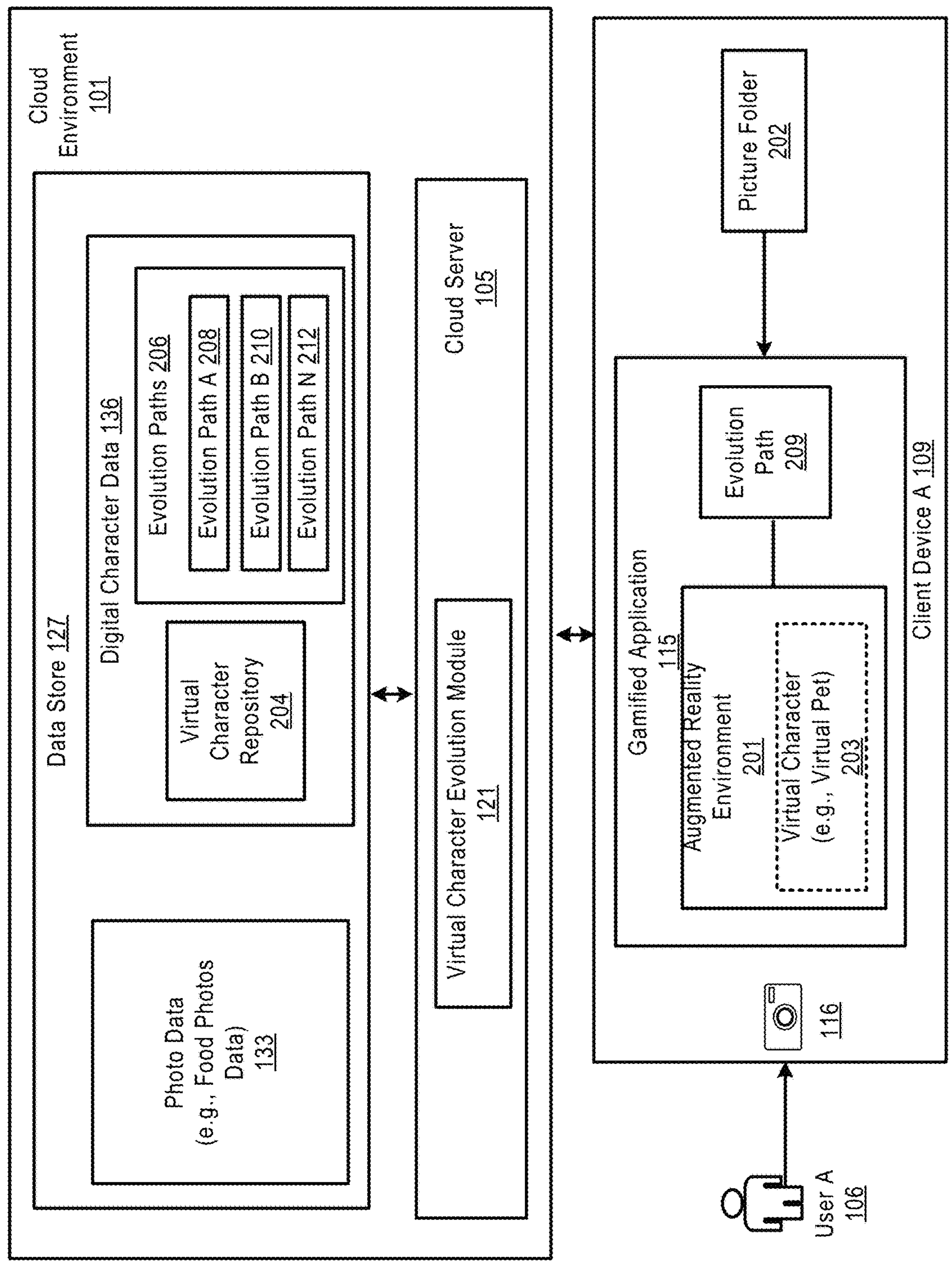
FIG. 2 further illustrates the example system in accordance with an embodiment.

FIG. 2 further illustrates the example system in accordance with an embodiment. More specifically, the figure illustrates an example augmented reality environment 201, in which a virtual character 203 can be displayed in response to user A 106 launching the gamified application 115 to take a photo of a food item.

A virtual character can be a person, an animal, a worm, or a bird, or any other creatures that may eat food in the real world. There can be a variety of virtual characters to cater to the preferences of people from around the world. For example, there can be a variety of pet animal characters, catering to the preferences of people of different age groups and genders. There can also be different virtual persons of different genders, in different age groups, and of different ethnicities.

Each virtual character in the example system may be associated with a counter that tracks the frequency that users has selected the virtual character to nurture. Periodically, the example system can adjust a repository of virtual characters 204 based on the frequencies of the characters being selected. Those with a frequency below a predetermined threshold can be removed; and one or more new virtual characters similar to an existing virtual character with a frequency above the threshold can be added to the repository 204. For one embodiment, a new virtual character is similar to an existing virtual character if the two virtual characters are of the same gender and of the same ethnicity; or of the same species, e.g., of the same animal type.

In one embodiment, a user who has not selected a virtual character can receive one or more suggestions for virtual characters that the user is likely to nurture. The suggestions can be generated based on existing food images stored in a picture folder 202 of the user's mobile device. The example system may invoke the image recognition APIs (e.g., the image recognition APIs 137 as described in FIG. 1 to classify images in the picture folder 202. If the number of food images of a particular type (e.g., fish) reaches a pre-set number (e.g., 5), the example system can suggest the most frequently selected virtual character compatible with the particular type of food. Alternatively, the example system can display a user interface that allows the user to browse the virtual character repository 204 to select a character to nurture.

In one embodiment, the virtual character 203 can be associated with an evolution path 209, which defines an ordered sequence of food items that the virtual character 203 needs to eat before it can evolve to a particular stage, at which the nurturer (i.e. user A 106 in this embodiment) would be eligible to claim one or more rewards in the example system. The rewards can be in a variety of forms, including monetary rewards. Alternatively, an evolution path may also include food times that are not in any particular order. The system would mark such an evolution path as completed as long as a virtual character has been fed with each food item specified in the evolution path.

In one embodiment, the virtual character evolution module 121 can define a set of behaviors for each virtual character in the virtual character repository 204, and map each of the set of behaviors to one or more food items. As the one or more food items are fed to a virtual character, the virtual character can display a corresponding behavior in augmented reality environment 201.

The data store 127 can include one or more data entities to store evolution paths 206 for the example system. Each data entity can be a database table, or a data structure, or another data object. As shown in FIG. 2, there can be a number of evolution paths 208, 210 and 212, which are predefined based on one or more surveys on the popular types of food items.

For example, evolution path A 208 can be a veggie evolution path that defines a number of veggie food items, including Avocado, Banana, Salad, and Tomato; evolution path B 210 can be an omnivore evolution path that defines a number of food items of both plant and animal origins, including Burger, Dumpling, Noodle, Beef, Pasta, Sushi, and Fish; evolution path N 212 can be a sweet evolution path that defines a number of sweet food items, including Cake, Cookies, Cupcake, and Donut.

In one embodiment, one or more of the evolution paths 206 can be constantly updated and new evolution paths can be created based on the existing food photos that have been uploaded by users of the example system. For example, the virtual character evolution module may periodically (e.g., once a week) perform an analysis of the photo data 133 to determine a geographical and content distribution of the uploaded food photos in the data store 127. Based on the analysis, new evolution paths can be created to balance the photo data. If the analysis determines that photos taken from a particular region is underrepresented, a premium evolution path can be created to include only food photos from that region, and a virtual character that has successfully evolved along such a premium evolution path would result in a bigger award for the user, thus further incentivizing the collection and labeling of food photos from that region. Premium evolution paths for certain types of food items can also be created to further incentivize the collection and labeling of those food items.

Each of the predefined evolution paths 208, 201 and 212 can be customized by user A 106 before the user associates that evolution path with the virtual character 203 selected by the user. In one embodiment, customizing an evolution path includes replacing a particular food item in the evolution path without reducing the total number of food items therein.

In one embodiment, user A 106 can treat the virtual character 203 as his or her avatar, and customize the evolution path 209 to match the user's personal heath goal. For example, if user A is a female person, and interested in weight loss, the user 106 can select a heavy female virtual character, and customize the evolution path 209 based on the user's meal plan for weight loss in real life. By synchronizing the user's personal meal plan for weight loss and the virtual character's evolution path, the user is more incentivized to eat the food items required for the evolution path, and is therefore more likely to take photos of those food items. Further, the user is also more likely to know the ingredients and nutrition facts of those food items, thereby providing higher-quality labeled training data for machine learning model training.

Figure 3:
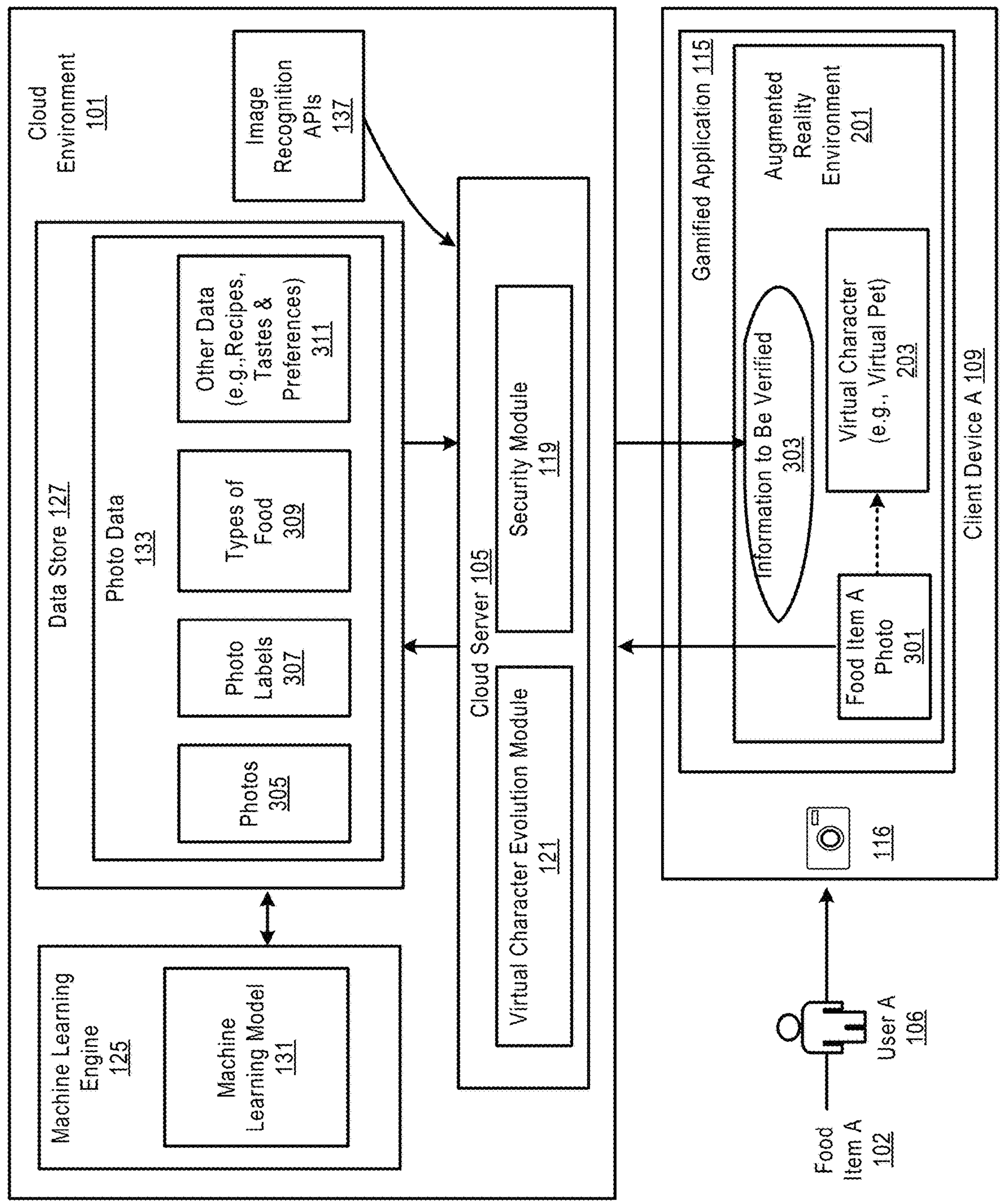
FIG. 3 further illustrates the example system in accordance with an embodiment.

FIG. 3 further illustrates the example system in accordance with an embodiment. More specifically, the figure illustrates the interactions between a client device and the cloud environment 101.

As shown in figure, in one embodiment, user A 106 can take a photo of food item A 102 and feed the photo 301 to the user's chosen virtual character 203. In response to the photo 301 being fed to the virtual character 203, the gamified application 115 can upload the photo 301 to the cloud server 105, which can invoke the image recognition APIs 137 to classify the uploaded photo 301 to generate a classification label and a set of metadata. The metadata can include the location where the photo is taken and the time when it is taken. The image recognition APIs can classify the photo into several categories at a high level, and each category can be associated with a probability value.

As an illustrative example, food item A 102 is a hand of bananas. When the photo 301 is fed to the virtual character 203, and is thereby uploaded to the cloud server 105, the imagine recognition APIs 137 can generate a list of classification labels ranked in a descending order by probability, as shown in Table 1 below:

TABLE 1

| | |
|---|---|
| Banana Family | 99% |
| Natural Foods | 99% |
| Banana | 98% |
| Yellow | 95% |
| Cooking Plantain | 95% |
| Saba Banana | 95% |

As shown in table 1, the image recognition APIs 137 determines that the food item represented by the uploaded food image 301 is mostly likely to be of "Banana family", and is natural food. Both classification labels have a 99% probability.

The cloud server 105 can send the classification label with the highest probability value to the gamified application 115 for display in the augmented reality environment 201. When there are two or more classification labels with the same probability values, the one ranked higher will be selected.

The augmented reality environment 210 can display information 303 related to the food image 301 for the user 106 to verify. In one embodiment, the information to be verified can include the classification label, which the user can deny, confirm or modify via voice input or text input. Additionally, in this embodiment, the augmented reality environment 210 can ask prompt the user to provide additional information for food item A 301. The additional information can include ingredients, nutrition facts, or both the ingredients and nutrition facts; and one or more utensils needed to make the food item. If the food item is a single-ingredient food, the augmented reality environment 210 can prompt the user to provide one or more dishes that the food item can be used to make. The verified classification label and the user-provided information can be sent back to the cloud server 105, which can store the food image 301, the verified classification label, and the user-provided information as well as the initial classification label and metadata generated by the image recognition APIs 137, into a number of tables 305, 307, 309 and 311 in the data store 127.

In another embodiment, instead of sending the highest-ranked classification label generated by the image recognition APIs 137, the cloud server 105 can provide the food image 301 as input to the custom machine learning model 131, which can generate another classification model, and a set of attributes which includes ingredients, or nutrition facts or both. The cloud server 105 can send the output of the custom machine learning model 131 to the gamified application 115 for verification. For example, the output—the classification and the set of attributes—can be displayed in the gamified application 115 as information 303. The user can verify the classification label and the set of attributes, including confirming, denying, or modifying both the classification labels and/or the set of attributes. The verified information by the user can then be sent to the cloud sever 105, which can store the verified information to the data store 127 in the tables 305, 307 309, and 311, together with the initial classification label and metadata generated by the image recognition APIs 137.

In one embodiment, a configuration setting can be provided in the example system for a system administrator to configure whether to send a classification label generated by the image recognition APIs 137 or the output of the custom machine learning model 131 to the gamified application 115 for verification.

Figure 4:
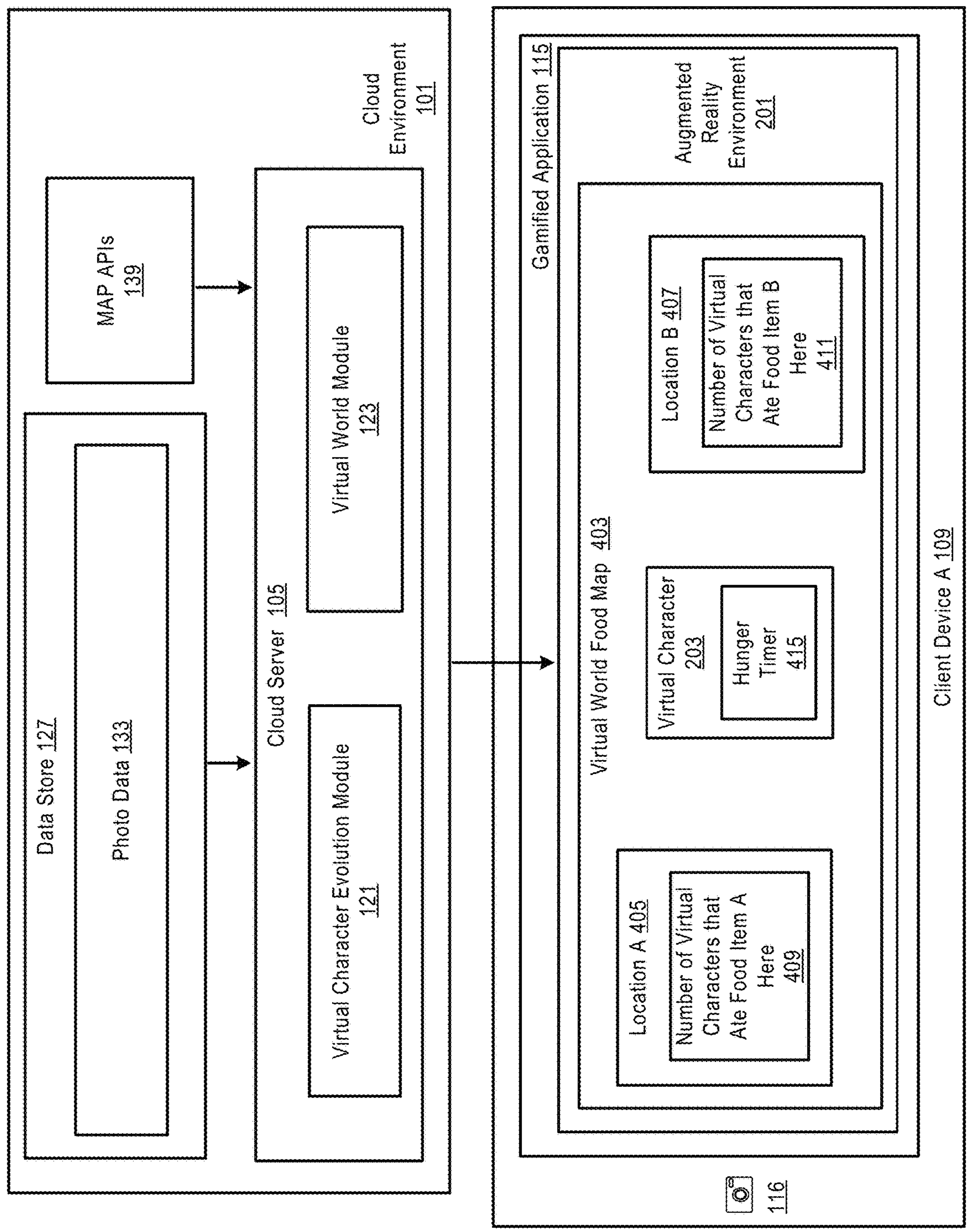
FIG. 4 further illustrates the example system in accordance with an embodiment.

FIG. 4 further illustrates the example system in accordance with an embodiment. More specifically, FIG. 4 illustrates a virtual world 403, which represents a food map created by the virtual world module 123 based on the map APIs 139 and the photo data 133.

In one embodiment, the virtual world module 124 can be configured to query the data store 127 to obtain a list of hot food items, which are most frequently uploaded during a past time period (e.g., during the past two weeks) within each geographical location. A geographic location can be an administrative unit, for example, a town or a district in a metropolitan; or a district corresponding to a zip code or postal code.

The list of hot food items within each geographical location can be placed on the food map 403. When a user physically moves within a predetermined range of one of the hot food items based on the location feature on the user's mobile device, the gamified application 115 can send an alert to the user about the hot food item. In one embodiment, the alert is generated only if the hot food item is on the evolution path of a virtual character that the user is to nurture.

In one embodiment, a hot food item can substitute for any required food item for the evolution path selected for the virtual character 203. The user can choose which required food item to replace in the evolution path. For example, if an evolution path for the virtual character 203 requires food items A, B, C, and D in sequence, and the user feeds a hot item within a geographical location to the virtual character 203 and chooses the hot item to replace food item A, then the user only needs to feed food items B, C and D to the virtual character 203 for the evolution path to complete.

As shown in FIG. 4, the virtual character 203 appears at a particular location on the food map 403, between location A 405 and location B 407. Each of location A 405 or location B 407 can be a restaurant, a cafeteria, or any place that serves food to the public; and can be associated with an indicator 409 or 411, showing the number of virtual characters in the example system that have eaten a particular hot food item at that location. Each of the indicators 409 and 411 can indicate the popularity of the particular hot food time at that particular location (e.g., restaurant).

In one embodiment, the virtual character 203 can include a hunger timer 415 which tracks the last time the virtual character 203 has eaten, and reminds the user that the virtual character 203 may die if it does not east within a future period of time, for example, within the next 48 hours. If the virtual character 203 dies, all the food items that the virtual character has eaten will be dissociated from the virtual character 203, the evolution path selected for the virtual character 203 would be emptied.

Figure 5:
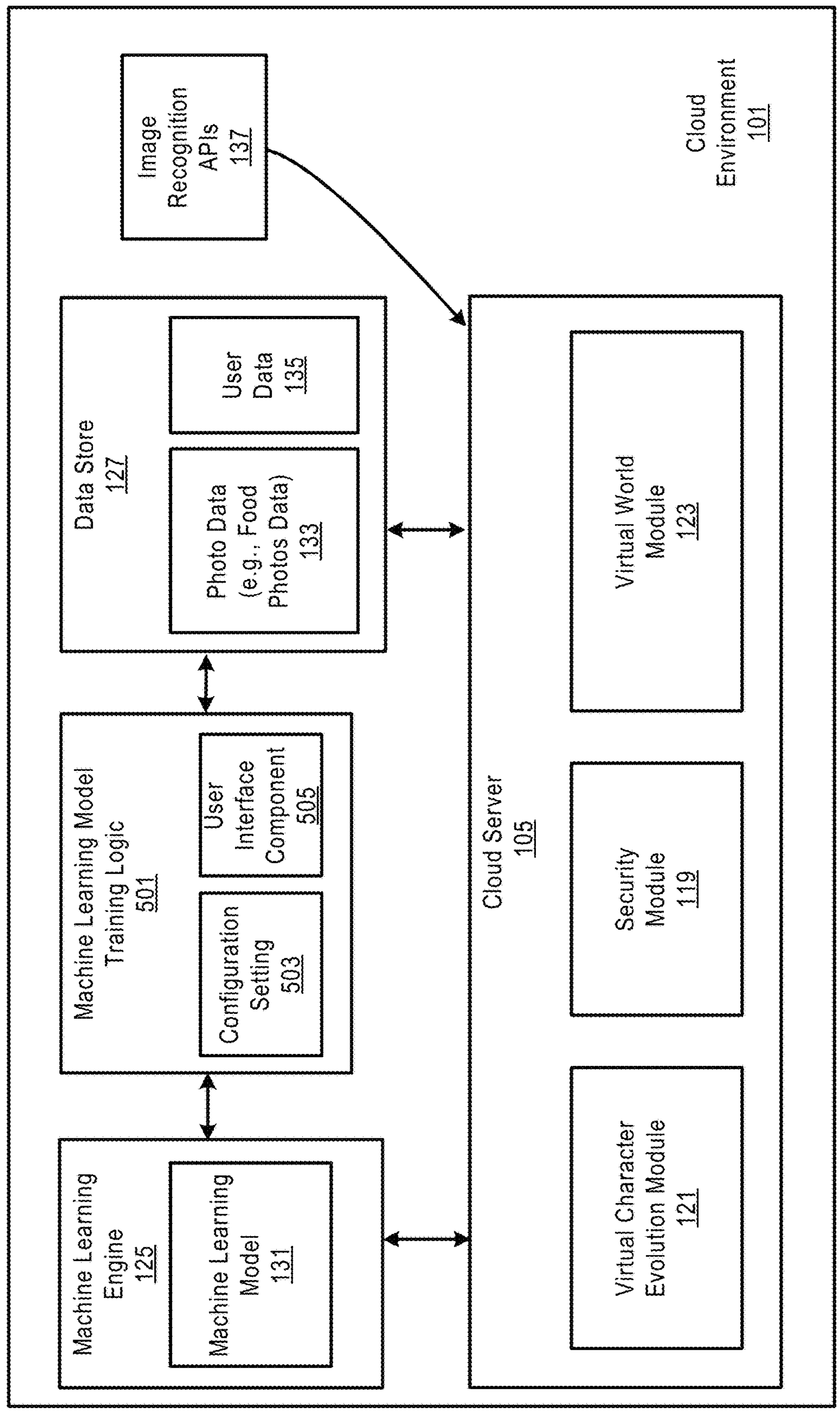
FIG. 5 further illustrates the example system in accordance with an embodiment.

FIG. 5 further illustrates an example of a system for training a machine learning model in accordance with an embodiment.

More specifically, the figure shows an example configuration for the training of the machine learning model 131. As described above, the machine learning model 131 can continue to be trained after it is up and running on the machine learning engine 125.

A training logic 501 can be provided between the custom machine learning model 131 and the data store 127. The training logic 501 can be a software module configured to retrieve training data from the data store 127 and provide the retrieved training data to the machine learning engine 125, which can be a managed cloud service or a platform for training and executing machine learning models.

In one embodiment, the training data for each training of the custom machine learning model 131 can include crowd-sourced photos, classification labels and metadata for the photos; classification labels and attributes verified by users.

The training logic 501 can also include a configuration setting 503 that is editable via a user interface 505 (e.g., a graphical user interface) by a system administrator of the example system. The configuration setting 503 can define the frequency at which the custom machine learning model 131 is to be trained, and the size of training data set retrieved from the data store 127 for each training.

Since the machine learning model 131 is initially trained using the image recognition APIs 137, and continues to be trained using a larger training data set that has been verified by many users, a substantial improvement in the performance of the machine learning model 131 can be expected compared to the image recognition API 137 over time.

In one embodiment, the machine learning engine 125 can be a managed cloud service or a deep learning container (e.g., a Python container) that can be used to train, re-train, and reference the machine learning model 131. The machine learning model 131 can be one of a variety of machine learning models, including a Random Forest model, a Xgboost model, a long short-term memory (LSTM) model, and a feedforward neural network model.

In one embodiment, the frequency at which the machine learning model 131 is to be re-trained can be hourly, daily, weekly or bi-weekly. Accordingly, by default, the size of the training data for each re-training of the machine learning model 131 can be the food photos collected during the last hour, the last day, the last week, or the last two weeks. The default configuration for the data size and the frequency can both be modified via the user interface component 505, which would receive user input for desired data sizes and/or desired frequencies via a graphical user interface (GUI).

In one embodiment, the GUI may include an option for a system administrator to specify a number of food photos (e.g., 2000 food photos) from a particular geographical location (e.g., China). Upon the successful persistence of the specified number of food photos from the geographical location by users, the machine learning engine 125 can be automatically kick off to re-train the machine learning model 131.

In an alternative embodiment, a different machine learning model can be initially trained and re-trained for a particular geographical location using food images from that geographical location. Whenever a new food photo is uploaded by a user from that geographical location, the machine learning model for the geographical location can be used to verify information related to the photo (e.g., the classification label) as described above in FIG. 3. The machine learning model for the geographical location can be re-trained when a specified number of food photos have been stored to the data store 133, or when a specified number of evolution paths for each type of evolution paths from geographical location have been completed.

Figure 6:
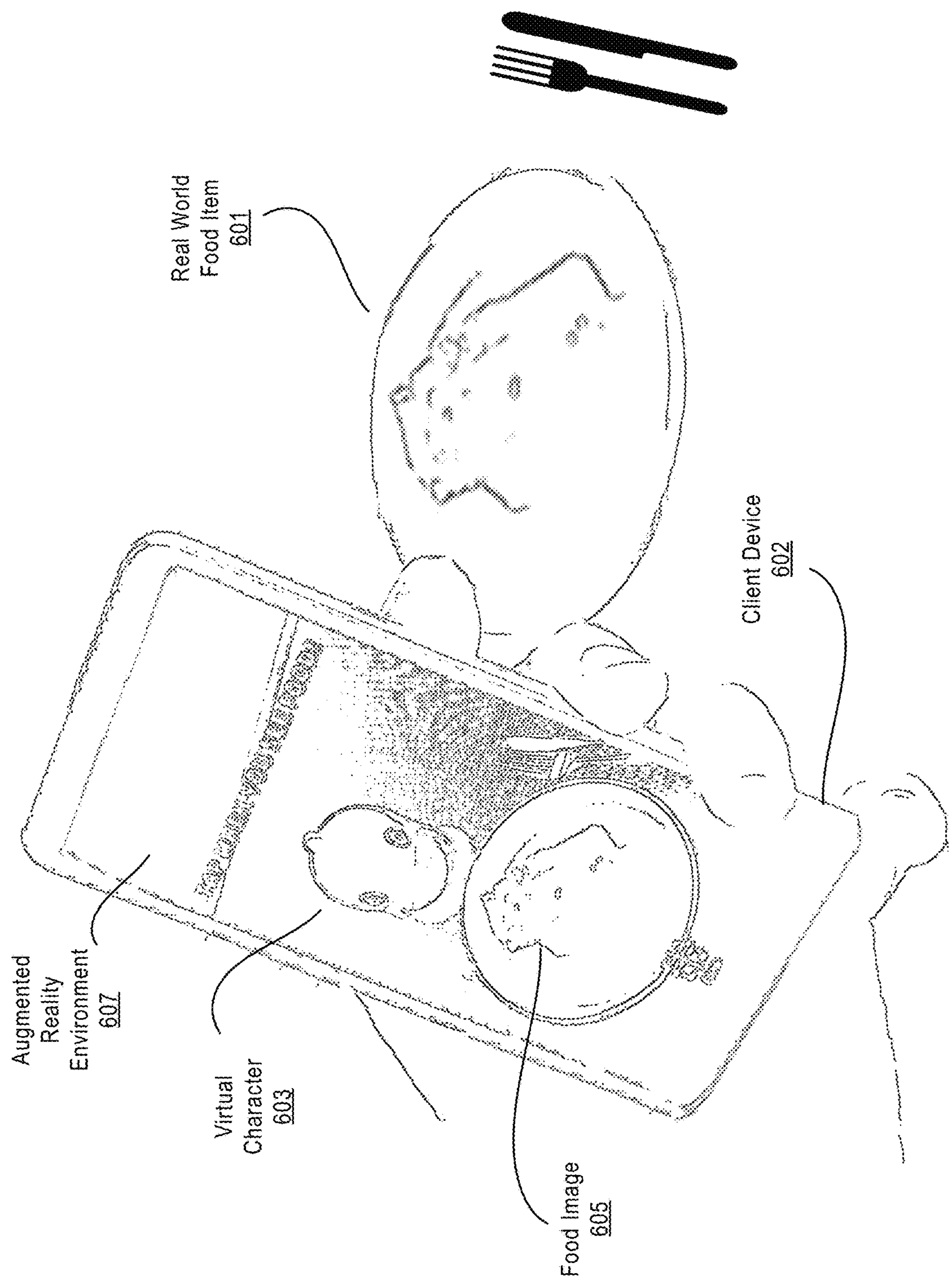
FIG. 6 illustrates an example game scene in accordance with an embodiment.

FIG. 6 illustrates an example game scene in accordance with an embodiment. More specifically, the figure shows that a user is taking an image 605 of a food item 601 in a real-world environment via an augmented reality environment 607 on a client device 602.

The augmented reality environment 607 blends an animated virtual character 603 into the real-world environment, such that the food image 605 can be fed to the virtual character 603 in the augmented reality environment 607.

Figure 7:
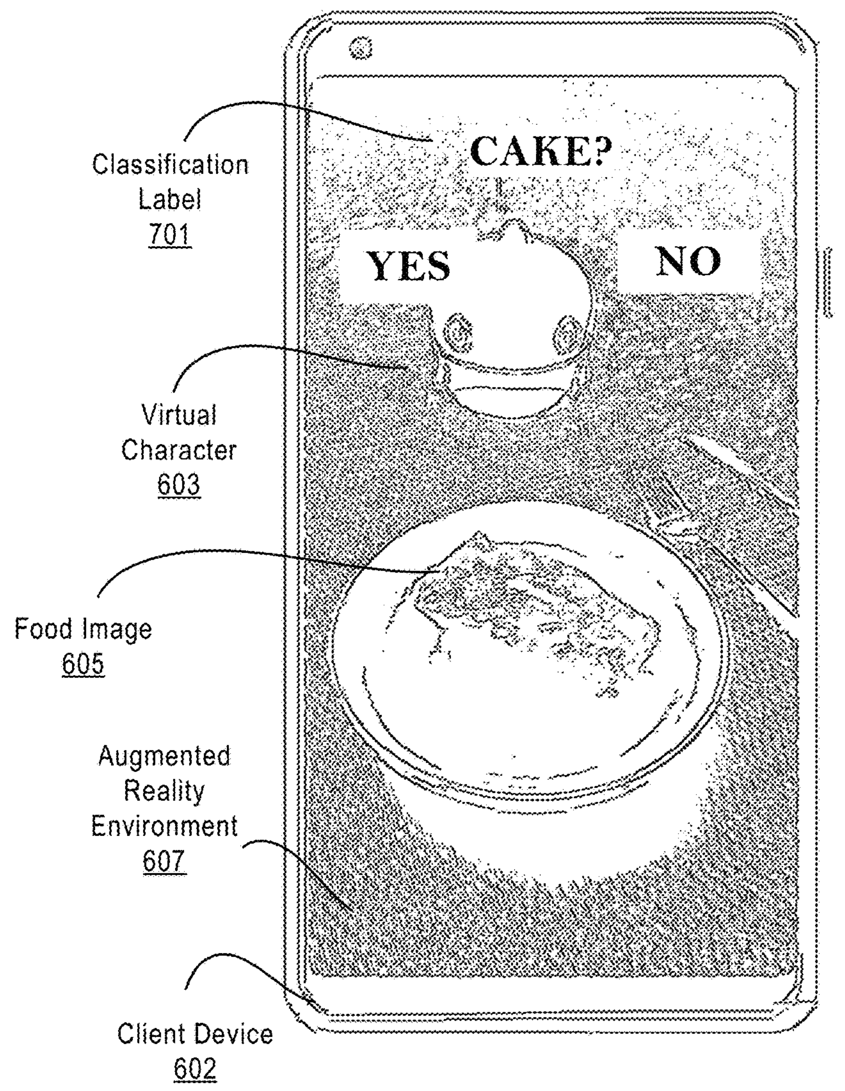
FIG. 7 illustrates another example game scene in accordance with an embodiment.
Figure 7:
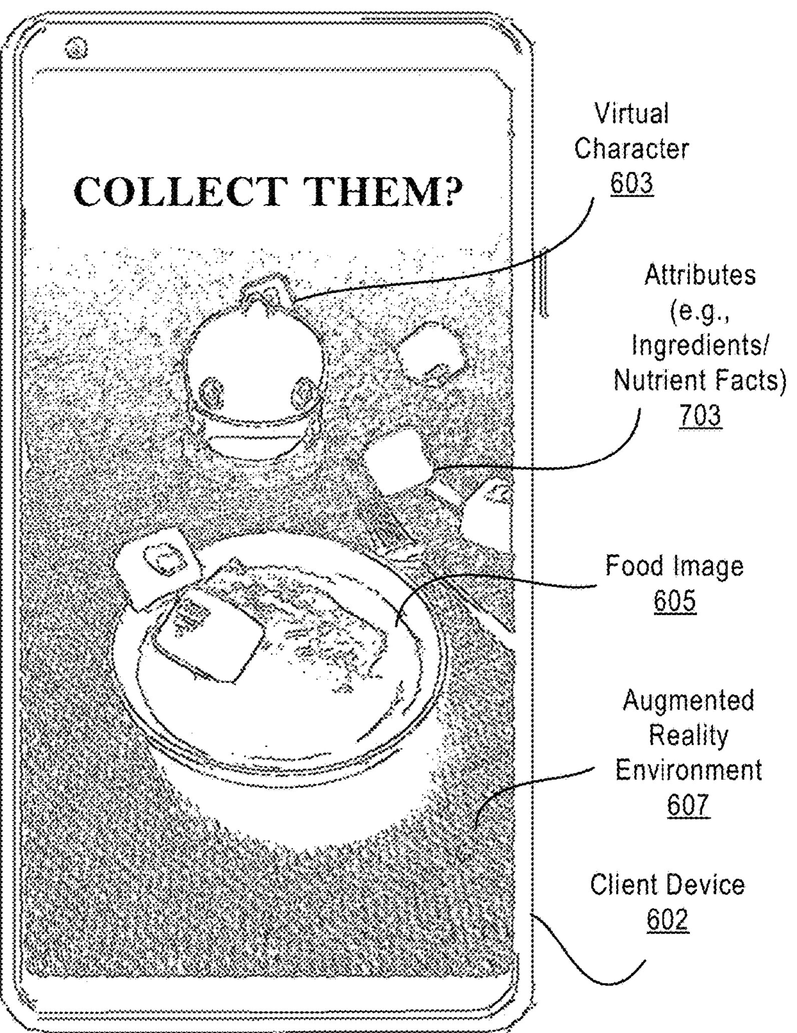

FIG. 7 illustrates another example game scene in accordance with an embodiment. This scene shows that a user verifies a classification label 701 and attributes 703 of the food item represented by the food image 605. The classification label "Cake" can be generated by the image recognition APIs 137 or the machine learning model 131 as shown in FIG. 1. The verifying of the classification label 701 may also include inputting a different classification label (e.g., "Apple Pie") by the user via text input or voice input. After the user verifies the classification label 701, the augmented reality 607 can display attributes 703 of the food image 605 in animated objects. For example, a number of cubes of different colors can be dancing around the food image 605, with each cube representing an ingredient of the food item represented by the food image 605.

Figure 8:
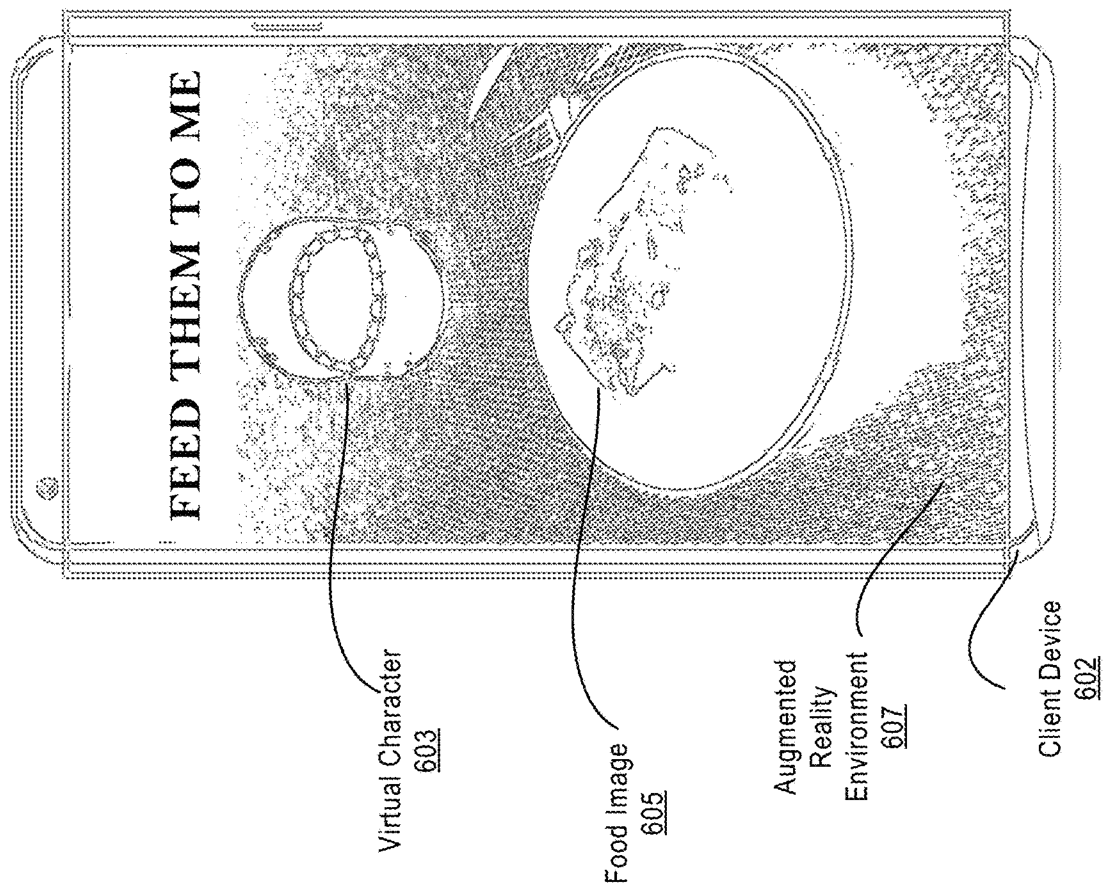
FIG. 8 shows another game scene in accordance with an embodiment.

FIG. 8 shows another game scene in accordance with an embodiment. The user can feed the food image 605 to the virtual character 603 after verifying the classification label, and the contents of the food represented by the food image 605. The user may also check whether the food item represented by the food image 605 can count towards the number of food items required for the evolution path of the virtual character before deciding to feed the food image 605 to the virtual character 605.

In one embodiment, feeding the food image 605 to the virtual character 603 can cause the food image 605 and the virtual character 603 to be associated with each other in the cloud server 105, which is configured to manage the properties of the virtual character, and to track the progress of the virtual character in fulfilling the requirement of the evolution path selected for the virtual character 603.

Figure 9:
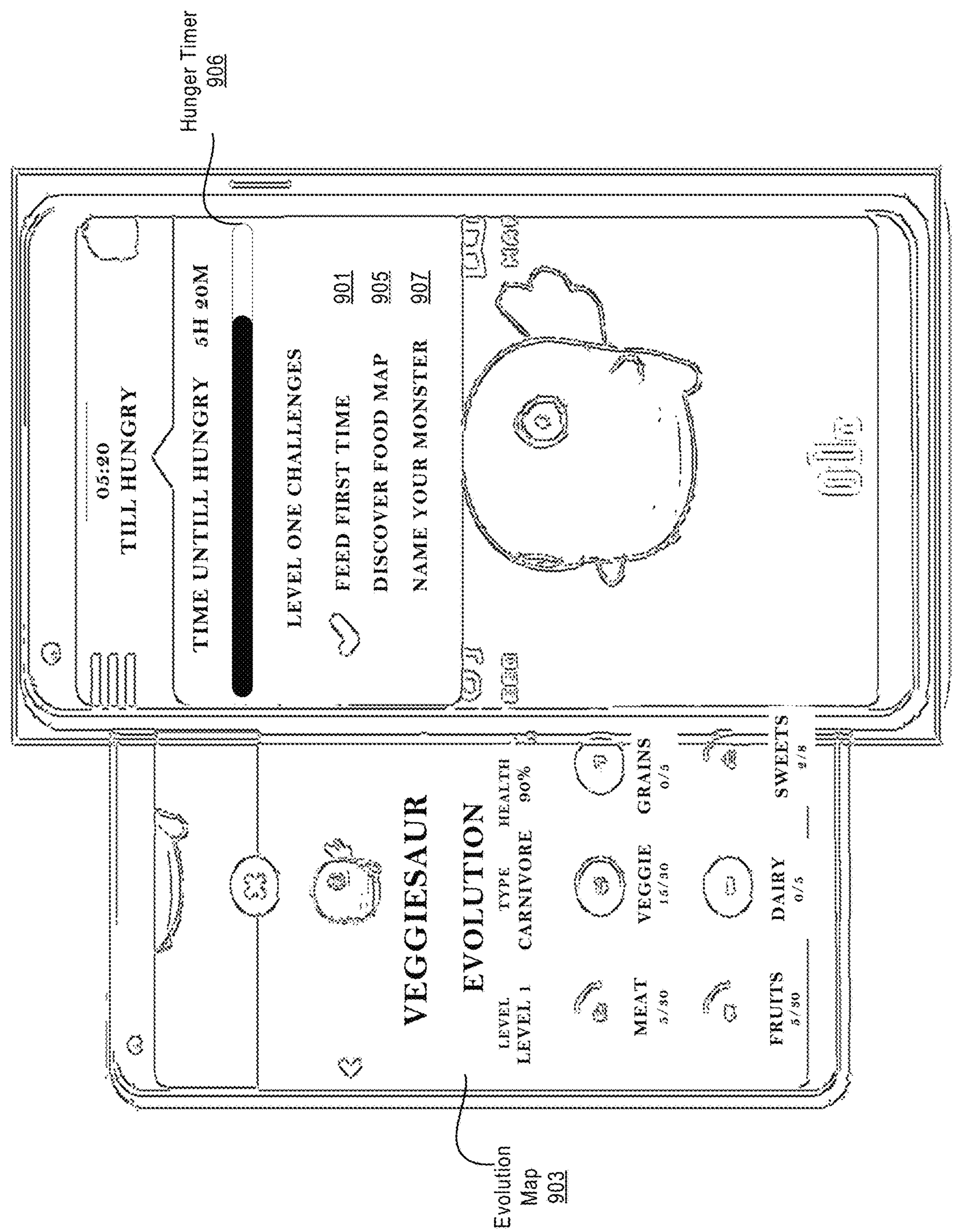
FIG. 9 illustrates guiding screens in accordance with an embodiment.

FIG. 9 illustrates guiding screens in accordance with an embodiment. An evolution map 903 can show a name of the virtual character (e.g., Veggiesaur) and information related to the evolution of the virtual character.

The guiding screens can show the level, the type and health of the virtual character, and the number of each type of food items required for the completion of the evolution path of the virtual character.

For example, the guiding screens can show that a total of 30 meat food items is required as part of the requirement for the completion of the evolution path, and that only 5 meat food items have been eaten by the virtual character.

The guiding screens also illustrate a hunger timer 906, which alerts the user of the time left before the virtual character will go hungry, and provides a number of challenges for the user to continue playing the game. For example, the challenges can include feeding the virtual character the first time 901, discovering a food map 905, and naming the virtual character 907.

FIG. 10 illustrates screens showing how a virtual character finds a next food item to eat in accordance with an embodiment.

Screen 1001 shows one or more hot/popular food items that other virtual characters have eaten on a particular day, and the food item that the user's virtual character has eaten. Screen 1005 shows a list of food items that the user's virtual character is craving. The cravings can be the food items required for the evolution path of the virtual character, Screen 1003 is a food map displaying one or more hot food items illustrated in screen 1001, a location where each hot food is available, and how many virtual characters have eaten each hot food item at that location. Therefore, the screens illustrated in the figure can provide information guiding the user's virtual character to evolve along a particular evolution path.

Figure 11:
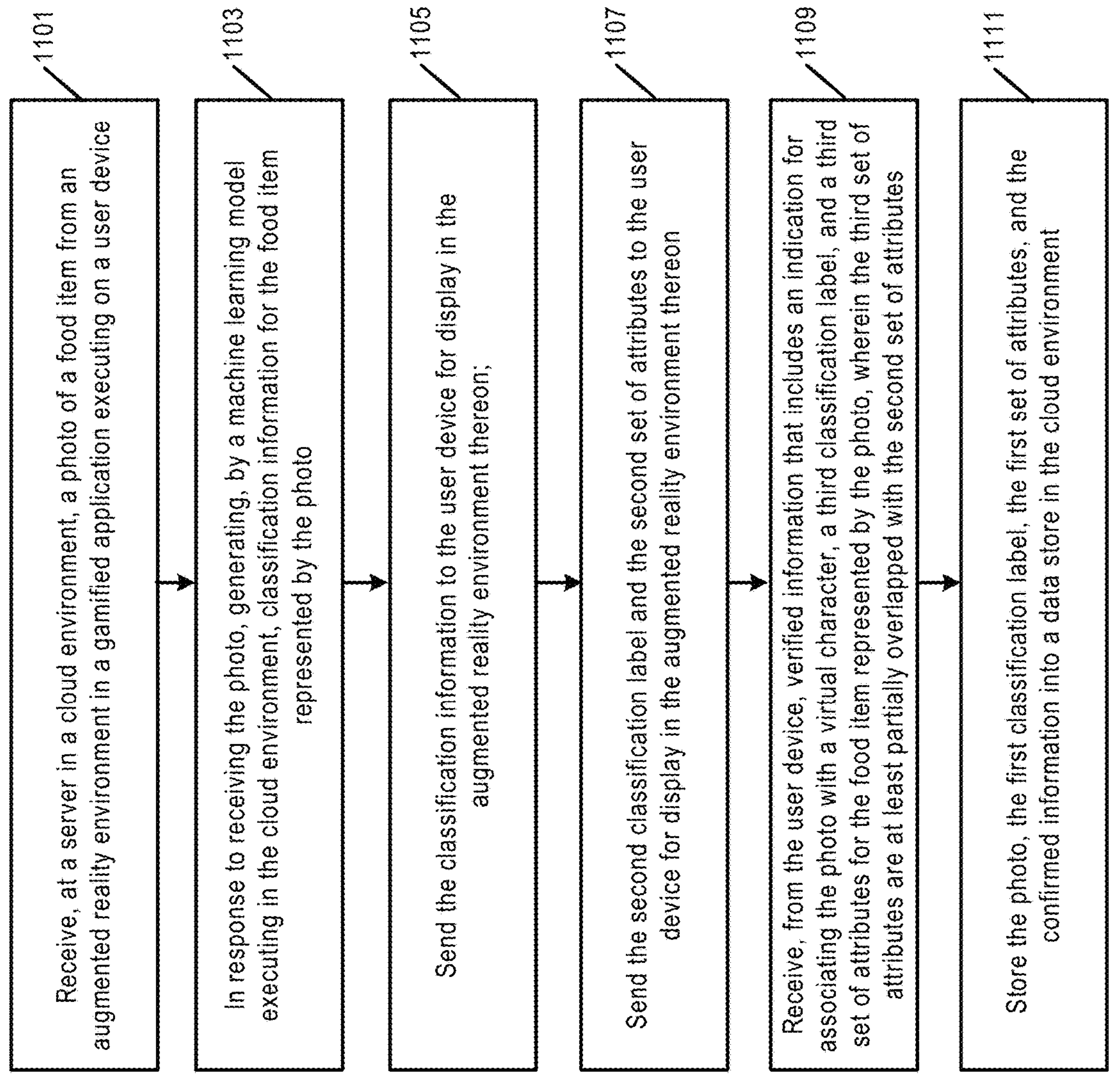
FIG. 11 illustrates an example process of data collection and labeling in accordance with an embodiment.

FIG. 11 illustrates an example process 1100 of method of data collection and labeling in accordance with an embodiment. Process 1100 may be performed by processing logic which may include software, hardware, or a combination thereof. For example, the processing logic can be implemented by the various modules 121, 119, and 123 in FIG. 1, and/or programs (e.g., training logic 501) in FIG. 5.

Referring back to FIG. 11, in operation 1101, the processing logic receives a photo of a food item from an augmented reality environment in a gamified application executing on a user device. In operation 1103, the processing logic generates a first set of attributes, and a first classification label for the photo, in response to receiving the photo. In operation 1105, the processing logic generates a second set of attributes and a second classification label for the food item represented by the photo. In operation 1107, the processing logic sends the second classification label and the second set of attributes to the user device for display in the augmented reality environment thereon. In operation 1109, the processing logic receives from the user device verified information that includes an indication for associating the photo with a virtual character, a third classification label, and a third set of attributes for the food item represented by the photo, wherein the third set of attributes are at least partially overlapped with the second set of attributes. In operation 1101, the processing logic stores the photo, the first classification label, the first set of attributes, and the verified information into a data store in the cloud environment.

Figure 12:
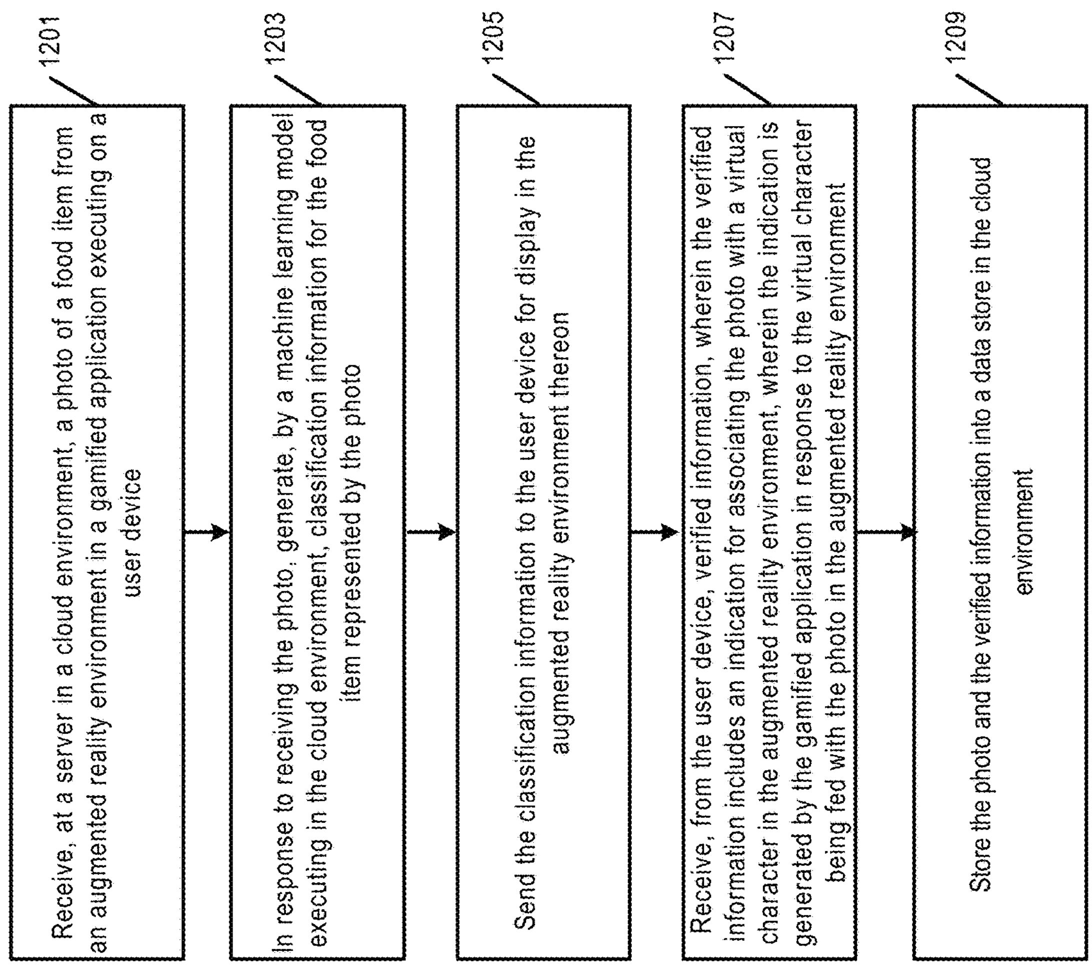
FIG. 12 illustrates another example process of data collection and labeling in accordance with an embodiment.

FIG. 12 illustrates another example process of data collection and labeling in accordance with an embodiment. Process 1100 may be performed by processing logic which may include software, hardware, or a combination thereof. Process 1200 may be performed by processing logic which may include software, hardware, or a combination thereof. For example, the processing logic can be implemented by the various modules 121, 119, and 123 in FIG. 1, and/or programs (e.g., training logic 501) in FIG. 5.

In FIG. 12, in operation 1201, the process logic receives a photo of a food item from an augmented reality environment in a gamified application executing on a user device. In operation 1203, the processing logic invokes a machine learning model to generate classification information for the food item represented by the photo. In operation 1205, the processing logic sends the classification information to the user device for display in the augmented reality environment thereon. In operation 1207, the processing logic receives, from the user device, verified information, wherein the verified information includes an indication for associating the photo with a virtual character in the augmented reality environment, wherein the indication is generated by the gamified application in response to the virtual character being fed with the photo in the augmented reality environment. In operation 1209, the processing logic stores the photo and the verified information into a data store in the cloud environment.

Figure 13:
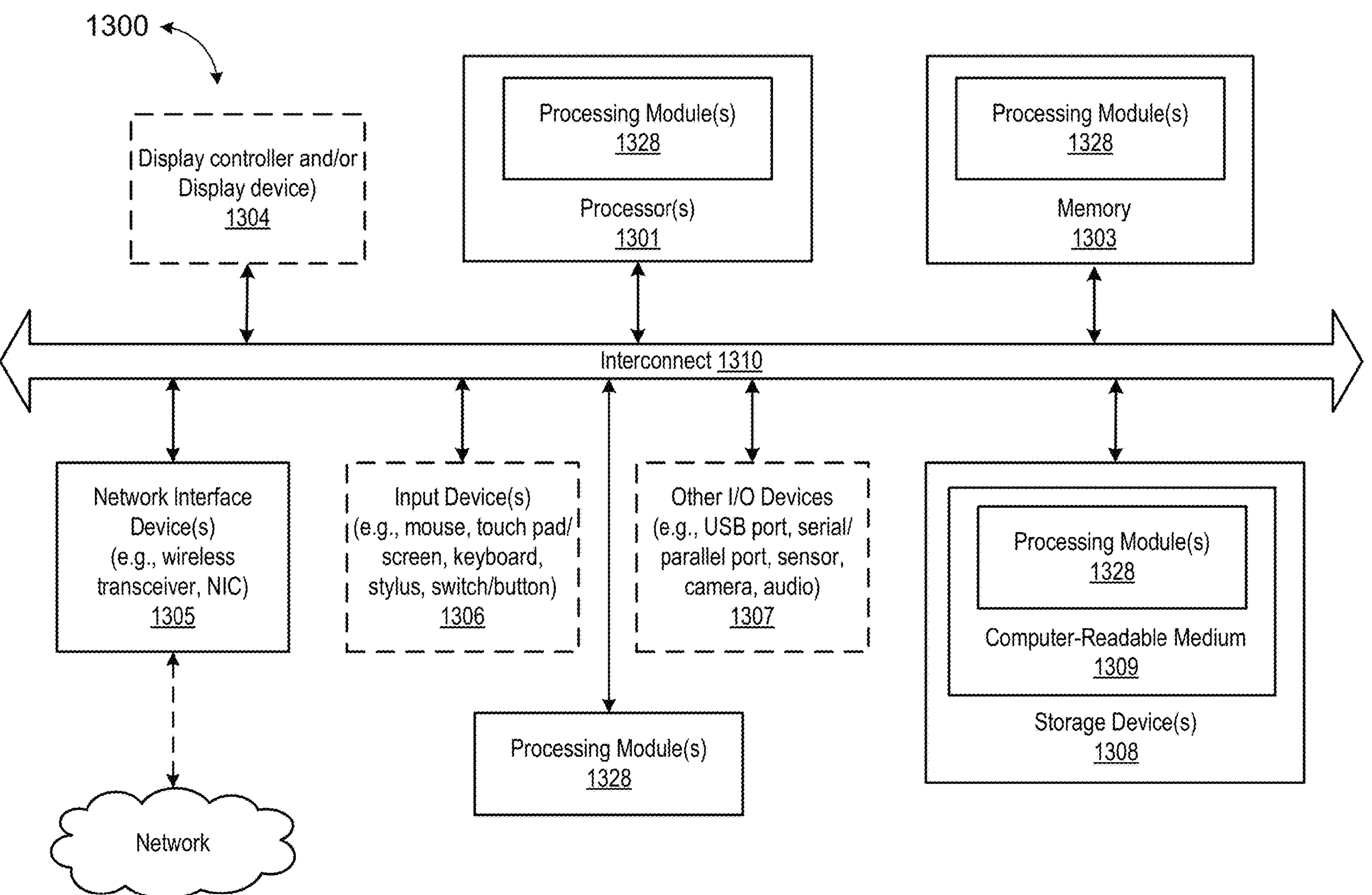
FIG. 13 is a block diagram illustrating an example of a data processing system which may be used with one embodiment of the disclosure.

FIG. 13 is a block diagram illustrating an example of a data processing system which may be used with one embodiment of the disclosure. For example, system 1300 may represent any of data processing systems described above performing any of the processes or methods described above. System 1300 can include many different components. These components may be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1300 is intended to show a high level view of many components of the computer system. However, it is to be understood that additional components may be present in certain implementations and furthermore, different arrangement of the components shown may occur in other implementations. System 1300 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1300 includes processor 1301, memory 1303, and devices 1305-1308 connected via a bus or an interconnect 1310. Processor 1301 may represent a single processor or multiple processors with a single processor core or multiple processor cores included therein. Processor 1301 may represent one or more general-purpose processors such as a microprocessor, a central processing unit (CPU), or the like. More particularly, processor 1301 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1301 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1301, which may be a low power multi-core processor socket such as an ultra-low voltage processor, may act as a main processing unit and central hub for communication with the various components of the system. Such processor may be implemented as a system on chip (SoC). Processor 1301 is configured to execute instructions for performing the operations and steps discussed herein. System 1300 may further include a graphics interface that communicates with optional graphics subsystem 1304, which may include a display controller, a graphics processor, and/or a display device.

Processor 1301 may communicate with memory 1303, which in one embodiment may be implemented via multiple memory devices to provide for a given amount of system memory. Memory 1303 may include one or more volatile storage (or memory) devices such as random access memory (RAM), dynamic RAM (DRAM), synchronous DRAM (SDRAM), static RAM (SRAM), or other types of storage devices. Memory 1303 may store information including sequences of instructions that are executed by processor 1301, or any other device. For example, executable code and/or data of a variety of operating systems, device drivers, firmware (e.g., input output basic system or BIOS), and/or applications may be loaded in memory 1303 and executed by processor 1301. An operating system may be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1300 may further include 10 devices such as devices 1305-1308, including network interface device(s) 1305, optional input device(s) 1306, and other optional 10 device(s) 1307. Network interface device 1305 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1306 may include a mouse, a touch pad, a touch sensitive screen (which may be integrated with display device 1304), a pointer device such as a stylus, and/or a keyboard (e.g., physical keyboard or a virtual keyboard displayed as part of a touch sensitive screen). For example, input device 1306 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1307 may include an audio device. An audio device may include a speaker and/or a microphone to facilitate voice-enabled functions, such as voice recognition, voice replication, digital recording, and/or telephony functions. Other IO devices 1307 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1307 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1310 via a sensor hub (not shown), while other devices such as a keyboard or thermal sensor may be controlled by an embedded controller (not shown), dependent upon the specific configuration or design of system 1300.

To provide for persistent storage of information such as data, applications, one or more operating systems and so forth, a mass storage (not shown) may also couple to processor 1301. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1301, e.g., via a serial peripheral interface (SPI). This flash device may provide for non-volatile storage of system software, including BIOS as well as other firmware of the system.

Storage device 1308 may include computer-accessible storage medium 1309 (also known as a machine-readable storage medium or a computer-readable medium) on which is stored one or more sets of instructions or software (e.g., module, unit, and/or logic 1328) embodying any one or more of the methods or functions described herein. Processing module/unit/logic 1328 may represent any of the components described above, such as, for example, planning module 305, control module 306. Processing module/unit/logic 1328 may also reside, completely or at least partially, within memory 1303 and/or within processor 1301 during execution thereof by data processing system 1300, memory 1303 and processor 1301 also constituting machine-accessible storage media. Processing module/unit/logic 1328 may further be transmitted or received over a network via network interface device 1305.

Computer-readable storage medium 1309 may also be used to store some software functionalities described above persistently. While computer-readable storage medium 1309 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1328, components and other features described herein may be implemented as discrete hardware components or integrated in the functionality of hardware components such as ASICS, FPGAs, DSPs or similar devices. In addition, processing module/unit/logic 1328 may be implemented as firmware or functional circuitry within hardware devices. Further, processing module/unit/logic 1328 may be implemented in any combination hardware devices and software components.

Note that while system 1300 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A game system, comprising:

a processor; and a memory coupled with the processor to store instructions, which when executed by the processor, cause the processor to perform operations of animating a virtual character in an augmented reality environment on a client device, the operations comprising:

receiving, from an augmented reality environment in a gamified application executing on a mobile device, a photo of a food item captured by a user of the mobile device using a camera installed thereon and information indicating that the food item has been fed to the virtual character displayed in the augmented reality environment, wherein the virtual character is mapped to an evolution path customized based on one or more attributes of the user of the mobile device, wherein a customized evolution path defines an ordered sequence of food items;

in response to the photo of the food item, associating the food item with the virtual character in a data store;

evolving the virtual character along the evolution path to a particular stage for an award, including modifying one or more animated behaviors of the virtual character, and counting towards a number of required food items for the evolution path selected for the virtual character;

generating an indication for a reward upon a completion of the evolution path;

generating, by a machine learning model executing in a cloud environment, classification information for the food item represented by the photo, wherein the classification information includes a classification label for the photo, and a set of attributes for the food item;

sending the classification information to the mobile device for display in the augmented reality environment thereon;

receiving, from the mobile device, verified information, wherein the verified information includes an indication for associating the photo with the virtual character, a verified classification label, a set of verified attributes; and storing the photo and the verified information into the data store in the cloud environment.

2. The system of claim 1, wherein the virtual character is a virtual pet.

3. The system of claim 1, wherein the gamified application is to generate an alert when the mobile device with the gamified application running thereon moves within a predetermined distance to a food item on the evolution path.

4. The system of claim 1, wherein the virtual character is selected based on one or more food pictures stored in a folder of the mobile device that are classified as being compatible with the virtual character.

5. A computer-implemented method for animating a virtual character in an augmented reality environment on a client device, the method comprising:

receiving, at a server in a cloud environment from an augmented reality environment in a gamified application executing on a mobile device, a photo of a food item captured by a user of the mobile device using a camera installed thereon and information indicating that the food item has been fed to the virtual character displayed in the augmented reality environment, wherein the virtual character is mapped to an evolution path customized based on one or more attributes of the user of the mobile device, wherein a customized evolution path defines an ordered sequence of food items;

in response to the photo of the food item, associating the food item with the virtual character in a data store;

evolving the virtual character along the evolution path to a particular stage for an award, including modifying one or more animated behaviors of the virtual character, and counting towards a number of required food items for the evolution path selected for the virtual character;

generating an indication for a reward upon a completion of the evolution path;

generating, by a machine learning model executing in the cloud environment, classification information for the food item represented by the photo, wherein the classification information includes a classification label for the photo, and a set of attributes for the food item;

sending the classification information to the mobile device for display in the augmented reality environment thereon;

receiving, from the mobile device, verified information, wherein the verified information includes an indication for associating the photo with the virtual character, a verified classification label, a set of verified attributes; and storing the photo and the verified information into the data store in the cloud environment.

6. The method of claim 5, wherein the virtual character is a virtual pet.

7. The method of claim 5, wherein the gamified application is to generate an alert when the mobile device with the gamified application running thereon moves within a predetermined distance to a food item on the evolution path.

8. The method of claim 5, wherein the virtual character is selected based on one or more food pictures stored in a folder of the mobile device that are classified as being compatible with the virtual character.

9. The method of claim 5, wherein the cloud environment includes a data store that maps the virtual character to one or more evolution paths customized based on the one or more attributes of the user of the mobile device.

10. The method of claim 5, wherein at least one of the set of verified attributes is input by the user via either voice or text via an interface in response to a confirmation prompt for the user to verify the classified information displayed in the augmented reality environment.

11. The method of claim 5, further comprising periodically retraining the machine learning model using data stored in the data store, wherein at least a portion of the data is labeled by verified information from a plurality of mobile devices.

12. The method of claim 5, wherein the set of verified attributes include a set of ingredients in the food item represented by the photo or a list of nutrients of the food item, a taste of the food item, and a smell of the food item.

13. The method of claim 5, further comprising:

generating, by a set of image recognition application programming interfaces (APIs) in the cloud environment, metadata for the photo, wherein the metadata includes a location where the photo is taken; and storing the metadata into the data store.

14. The method of claim 5, further comprising wherein customizing the evolution path, including replacing a particular food item on the evolution path without reducing a total number of food items therein.

15. The method of claim 14, wherein the evolution path is generated based on an analysis of photo data in the data store to balance a content and/or geographical distribution of the photo data in the data store.

16. A non-transitory machine-readable medium having instructions stored therein, which when executed by a processor, cause the processor to perform operations, the operations comprising:

receiving, at a server in a cloud environment from an augmented reality environment in a gamified application executing on a mobile device, a photo of a food item captured by a user of the mobile device using a camera installed thereon and information indicating that the food item has been fed to a virtual character displayed in the augmented reality environment, wherein the virtual character is mapped to an evolution path customized based on one or more attributes of the user of the mobile device, wherein a customized evolution path defines an ordered sequence of food items;

in response to the photo of the food item, associating the food item with the virtual character in a data store;

evolving the virtual character along the evolution path to a particular stage for an award, including modifying one or more animated behaviors of the virtual character, and counting towards a number of required food items for the evolution path selected for the virtual character;

generating an indication for a reward upon a completion of the evolution path;

generating, by a machine learning model executing in the cloud environment, classification information for the food item represented by the photo, wherein the classification information includes a classification label for the photo, and a set of attributes for the food item;

sending the classification information to the mobile device for display in the augmented reality environment thereon;

receiving, from the mobile device, verified information, wherein the verified information includes an indication for associating the photo with the virtual character, a verified classification label, a set of verified attributes; and storing the photo and the verified information into the data store in the cloud environment.

17. The machine-readable medium of claim 16, wherein the virtual character is a virtual pet.

* * * * *